United States Patent
Shah

(10) Patent No.: US 10,749,702 B2
(45) Date of Patent: Aug. 18, 2020

(54) MULTICAST SERVICE TRANSLATION IN INTERNET PROTOCOL TELEVISION SYSTEMS

(71) Applicant: Telefonaktiebolaget LM Ericsson (publ), Stockholm (SE)

(72) Inventor: Sunil Shah, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 16/308,385

(22) PCT Filed: Jun. 9, 2016

(86) PCT No.: PCT/IB2016/053377
§ 371 (c)(1),
(2) Date: Dec. 7, 2018

(87) PCT Pub. No.: WO2017/212316
PCT Pub. Date: Dec. 14, 2017

(65) Prior Publication Data
US 2019/0140854 A1    May 9, 2019

(51) Int. Cl.
*H04L 12/26* (2006.01)
*H04L 12/18* (2006.01)
(Continued)

(52) U.S. Cl.
CPC ........ *H04L 12/185* (2013.01); *H04L 41/5003* (2013.01); *H04L 45/16* (2013.01); *H04N 21/6405* (2013.01)

(58) Field of Classification Search
CPC ... H04L 12/185; H04L 41/5003; H04L 45/15; H04N 21/6405
(Continued)

(56) References Cited

U.S. PATENT DOCUMENTS 6,831,917 B1   12/2004  Cheriton
8,594,288 B2 *  11/2013  Robbins .............. H04M 1/2757
                                                                379/142.06
(Continued)

FOREIGN PATENT DOCUMENTS

EP   1424806 A1    6/2004
EP   2520052 A1   11/2012
EP   2567510 A1    3/2013

OTHER PUBLICATIONS

International Preliminary Report on Patentability for related International Application No. PCT/IB2016/053377, dated Dec. 20, 2018, 10 pages.
(Continued)

*Primary Examiner* — Thai D Hoang
(74) *Attorney, Agent, or Firm* — Sage Patent Group

(57) ABSTRACT

Techniques are described for multicast service translation. A router can provide access to a particular source for an Internet Protocol Television (IPTV) channel that is most appropriate for the subscriber despite the subscriber requesting the IPTV channel from a different source. The most appropriate source can be identified based upon a bit rate or quality of service associated with the subscriber and/or a bit rate or quality of service associated with each of one or more alternate sources of the IPTV channel. The router can receive a request to join a multicast stream from a client device of the subscriber that identifies a source associated with an IPTV channel, identify a different source of the IPTV channel for that subscriber, and transmit a different join request destined to the different source.

20 Claims, 10 Drawing Sheets

(51) Int. Cl.
*H04L 12/761* (2013.01)
*H04L 12/24* (2006.01)
*H04N 21/6405* (2011.01)

(58) Field of Classification Search
USPC ........ 370/390, 392–393, 259–266, 270, 271, 370/468, 532–541
See application file for complete search history.

(56) References Cited

U.S. PATENT DOCUMENTS

| | | | | |
|---|---|---|---|---|
| 8,760,469 | B2* | 6/2014 | Roberts | H04N 21/4788 |
| | | | | 345/629 |
| 9,178,809 | B1* | 11/2015 | Shen | H04L 12/4633 |
| 9,292,826 | B1 | 3/2016 | Chen et al. | |
| 10,499,101 | B2* | 12/2019 | Picucci | H04N 21/47202 |
| 2009/0274285 | A1* | 11/2009 | Robbins | H04M 3/4935 |
| | | | | 379/142.05 |
| 2010/0179984 | A1* | 7/2010 | Sebastian | H04L 69/04 |
| | | | | 709/203 |
| 2010/0262992 | A1* | 10/2010 | Casagrande | H04N 7/165 |
| | | | | 725/34 |
| 2010/0284412 | A1* | 11/2010 | Meuninck | H04L 12/2834 |
| | | | | 370/401 |
| 2011/0188500 | A1* | 8/2011 | Du | H04L 45/16 |
| | | | | 370/390 |
| 2011/0321089 | A1* | 12/2011 | Holley | H04N 5/44543 |
| | | | | 725/39 |
| 2012/0039334 | A1* | 2/2012 | Mehta | H04L 12/1886 |
| | | | | 370/390 |
| 2012/0222065 | A1* | 8/2012 | Prins | H04N 21/432 |
| | | | | 725/32 |
| 2014/0040353 | A1* | 2/2014 | Sebastian | H04L 67/06 |
| | | | | 709/203 |
| 2014/0053208 | A1* | 2/2014 | Sirpal | H04N 21/42219 |
| | | | | 725/52 |
| 2015/0103844 | A1* | 4/2015 | Zhao | H04L 45/42 |
| | | | | 370/410 |
| 2017/0180798 | A1* | 6/2017 | Goli | H04N 21/26603 |
| 2017/0295282 | A1* | 10/2017 | Delorme | H04M 3/42076 |
| 2017/0374546 | A1* | 12/2017 | Nielsen | H04R 29/004 |
| 2018/0091567 | A1* | 3/2018 | Bekiares | H04L 65/4076 |
| 2019/0268256 | A1* | 8/2019 | Mirsky | H04L 69/40 |

OTHER PUBLICATIONS

International Search Report and Written Opinion for related International Application No. PCT/IB2016/053377, dated Mar. 2, 2017, 13 pages.
European Office Action dated Jun. 23, 2020 for European Patent Application No. EP 16729382.8, 10 pages.

* cited by examiner

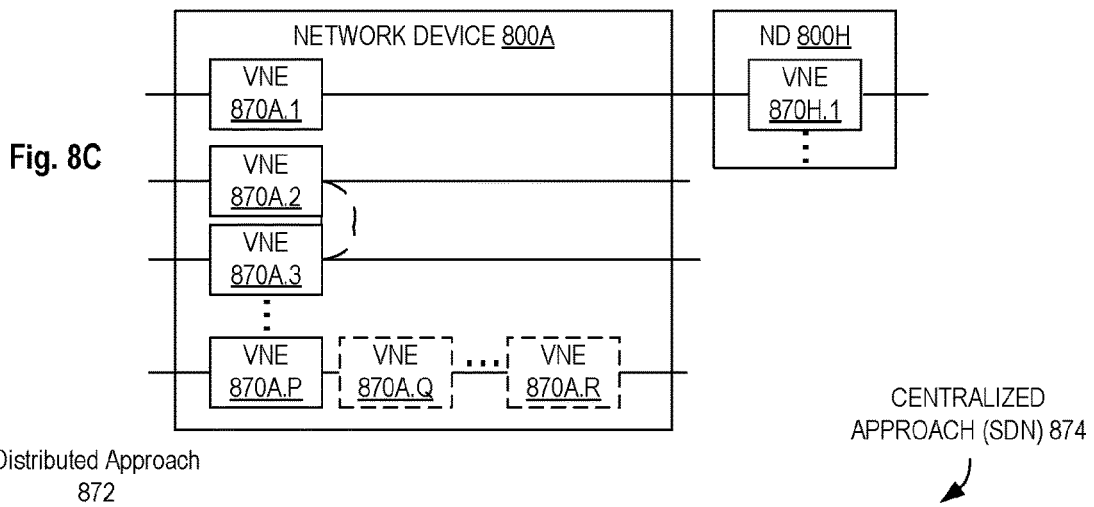
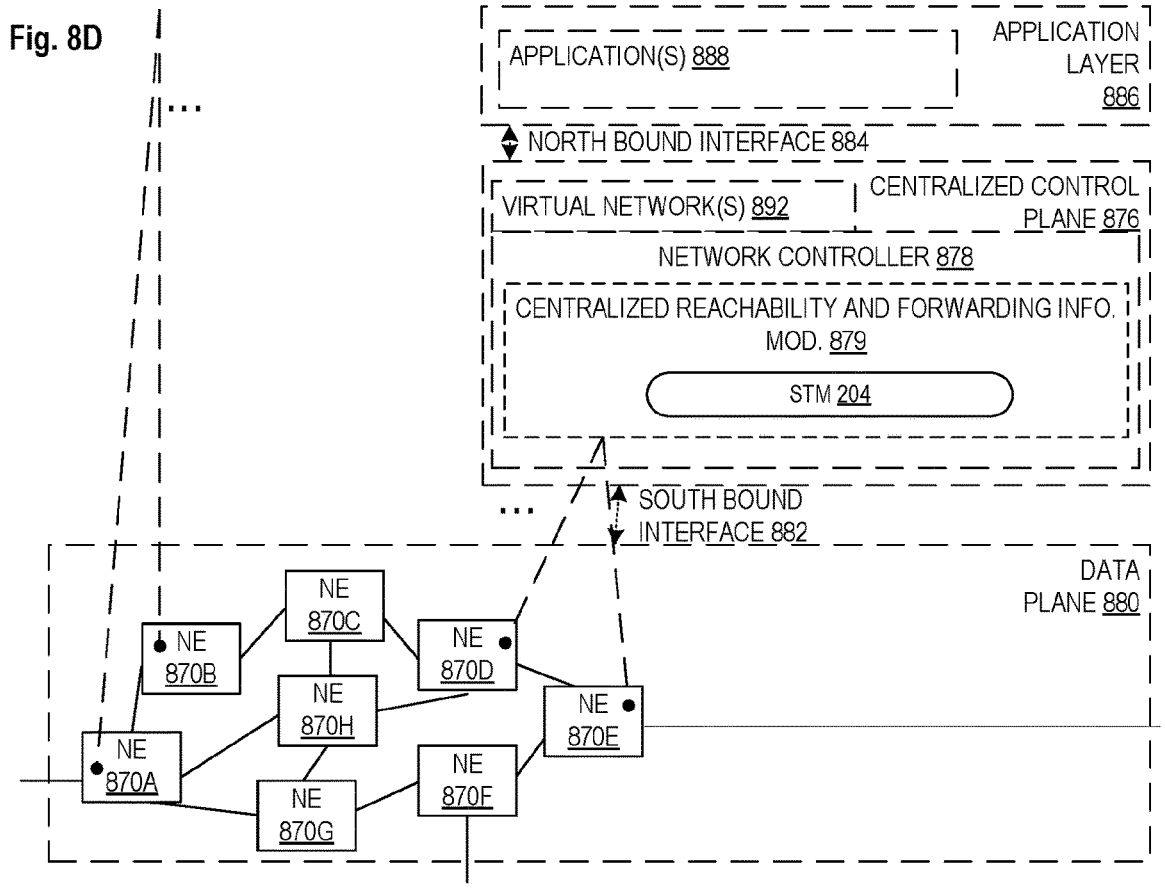
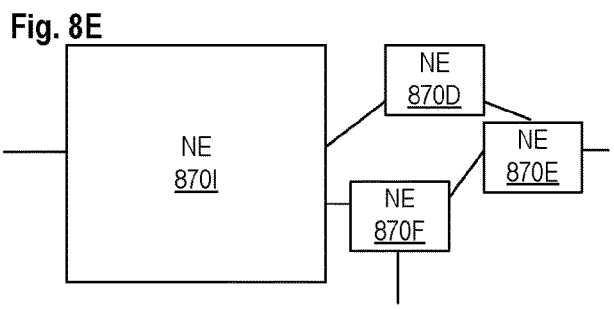
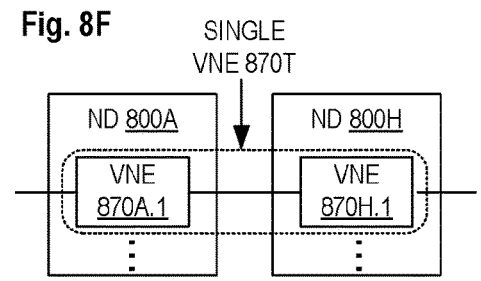

MULTICAST SERVICE TRANSLATION IN INTERNET PROTOCOL TELEVISION SYSTEMS

CROSS-REFERENCE TO RELATED APPLICATIONS

This application is a national stage of International Application No. PCT/IB2016/053377, filed Jun. 9, 2016, which is hereby incorporated by reference.

FIELD

Embodiments relate to the field of computing systems; and more specifically, to multicast service translation in Internet Protocol Television (IPTV) systems.

BACKGROUND

Internet Protocol Television (IPTV) is a service that streams multimedia content over a packet-switched network using the Internet Protocol (IP) suite. IPTV typically uses multicasting to stream IPTV content from a multicast source to a multicast group. Subscribers can access a particular IPTV channel multicast stream by joining a multicast group corresponding to that IPTV channel.

A group management protocol such as Internet Group Management Protocol (IGMP) is typically used for joining and leaving multicast groups in IPTV. A subscriber that wishes to access an IPTV channel multicast stream will send an IGMP Report message to a network device such as a multicast router requesting access to the IPTV channel's multicast stream. The network device receives the request and performs Connection Admission Control (CAC) operations to determine whether the subscriber's request should be allowed or denied.

If the subscriber's request is allowed, then the network device operates to forward the IPTV channel multicast stream to the subscriber. The IPTV channel multicast stream is delivered over a routing path established by a multicast routing protocol such as Protocol Independent Multicast (PIM).

SUMMARY

A method in a router implemented by a device provides for multicast service translation. The method includes receiving a first join request message originated by a first client device of a first subscriber indicating a request to become a member of a multicast group to receive data for an Internet Protocol Television (IPTV) channel. The first join request message includes a first source identifier associated with the IPTV channel. The method also includes, responsive to said receiving the first join request message, transmitting a second join request message to a second source identified by a second source identifier instead of the first source identifier. The second source identifier is different than the first source identifier. The second source provides data for the IPTV channel and was selected as a recipient of the second join request message based upon a service bit rate of the first subscriber.

In some embodiments, after said receiving the first join request message, the method also includes determining a service level of the first subscriber. The service level is associated with the service bit rate of the first subscriber. In some embodiments, after said receiving the first join request message, the method also includes selecting, based upon the determined service level, the second source identifier from a plurality of channel source identifiers of a plurality of sources to be used as sources of data for the IPTV channel. The second source provides the IPTV channel at a bit rate that is the same as the service bit rate of the first subscriber or at a closest bit rate to the service bit rate when compared to other bit rates of others of the plurality of sources.

In some embodiments, after said receiving the first join request message, the method includes transmitting a message to a controller of a Software Defined Networking (SDN) network. The message causes the controller to determine a service level assigned to the first subscriber and further causes the controller to identify, based upon the determined service level, the second source to be used to provide the IPTV channel to the first client device of the first subscriber. In some embodiments, after said receiving the first join request message, the method also includes receiving, from the controller, configuration data for a first multicast entry that comprises the second source identifier that identifies the second source. The first multicast entry is to be used by the router to forward data for the IPTV channel transmitted by the second source toward the first client device of the first subscriber.

In some embodiments, the first join request message is an Internet Group Management Protocol (IGMP) version 3 (IGMPv3) message or a Multicast Listener Discovery (MLD) version 2 (MLDv2) message. In some embodiments, the second join request message is a Protocol Independent Multicast (PIM) join message.

In some embodiments, the method further includes receiving a third join request message originated by a second client device of a second subscriber indicating a request to become a member of the multicast group to receive data for the IPTV channel. The third join request message includes the first source identifier associated with the IPTV channel. In some embodiments, the method also includes transmitting a fourth join request message to a third source identified by a third source identifier of a third source instead of the first source identifier. The third source identifier is different than the first source identifier and is also different than the second source identifier. The third source provides data for the IPTV channel and was selected as a recipient of the fourth join request message based upon a second service bit rate of the second subscriber.

In some embodiments, the method includes creating a first multicast entry that comprises a first incoming interface (IIF) value identifying the second source and a single first outgoing interface (OIF) value identifying a first circuit leading to the first client device. In some embodiments, the method also includes creating a second multicast entry that comprises a second IIF value identifying a third source and a single second OIF value identifying a second circuit leading to a second client device. In some embodiments, the method also includes receiving a plurality of packets from the second source, and transmitting the plurality of packets over the first circuit leading to the first client device without dropping any of the plurality of packets.

In some embodiments, the first source identifier is a placeholder identifier that does not identify any actual source of the IPTV channel.

In some embodiments, the first source identifier is an actual identifier for a source of the IPTV channel. In some embodiments, the method further includes receiving a fifth join request message originated by a third client device of a third subscriber indicating a request to become a member of the multicast group to receive data for the IPTV channel. The third join request message includes the first source identifier associated with the IPTV channel. In some embodiments, the method further includes transmitting a sixth join request message to the first source identified by the first source identifier. The first source provides data for the IPTV channel and was selected as a recipient of the sixth join request message based upon a third service bit rate of the third subscriber.

According to some embodiments, a non-transitory machine-readable storage medium having instructions which, when executed by one or more processors of a device, cause the device to implement a router for multicast service translation (e.g., perform any of the above methods). The router is adapted to receive a first join request message originated by a first client device of a first subscriber indicating a request to become a member of a multicast group to receive data for an Internet Protocol Television (IPTV) channel. The first join request message includes a first source identifier associated with the IPTV channel. The router is also adapted to, responsive to said receiving the first join request message, transmit a second join request message to a second source identified by a second source identifier instead of the first source identifier. The second source identifier is different than the first source identifier. The second source provides data for the IPTV channel and was selected as a recipient of the second join request message based upon a service bit rate of the first subscriber.

According to some embodiments, a computer program product has computer program logic arranged to put into effect multicast service translation (e.g., perform any of the above methods). The computer program logic can implement a router adapted to receive a first join request message originated by a first client device of a first subscriber indicating a request to become a member of a multicast group to receive data for an Internet Protocol Television (IPTV) channel. The first join request message includes a first source identifier associated with the IPTV channel. The router can also be adapted to, responsive to said receiving the first join request message, transmit a second join request message to a second source identified by a second source identifier instead of the first source identifier. The second source identifier is different than the first source identifier. The second source provides data for the IPTV channel and was selected as a recipient of the second join request message based upon a service bit rate of the first subscriber.

According to some embodiments, a device includes one or more processors and a non-transitory machine-readable storage medium. The non-transitory machine-readable storage medium has instructions which, when executed by the one or more processors, cause the device to implement a router for multicast service translation (e.g., perform any of the above methods). The router is adapted to receive a first join request message originated by a first client device of a first subscriber indicating a request to become a member of a multicast group to receive data for an Internet Protocol Television (IPTV) channel. The first join request message includes a first source identifier associated with of the IPTV channel. The router is also adapted to, responsive to said receiving the first join request message, transmit a second join request message to a second source identified by a second source identifier instead of the first source identifier. The second source identifier is different than the first source identifier. The second source provides data for the IPTV channel and was selected as a recipient of the second join request message based upon a service bit rate of the first subscriber.

According to some embodiments, a device comprises a multicast service adaptation module. The multicast service adaptation module is adapted to receive a first join request message originated by a first client device of a first subscriber indicating a request to become a member of a multicast group to receive data for an Internet Protocol (IP) television (IPTV) channel. The first join request message includes a first source identifier associated with the IPTV channel. The multicast service adaptation module is also adapted to, responsive to said receipt of the first join request message, transmit a second join request message to a second source identified by a second source identifier instead of the first source identifier. The second source identifier is different than the first source identifier, and the second source provides data for the IPTV channel and was selected as a recipient of the second join request message based upon a service bit rate of the first subscriber.

According to some embodiments, a device includes a module adapted to receive a first join request message originated by a first client device of a first subscriber indicating a request to become a member of a multicast group to receive data for an Internet Protocol (IP) television (IPTV) channel. The first join request message includes a first source identifier associated with of the IPTV channel. The device also includes a module adapted to, responsive to said receipt of the first join request message, transmit a second join request message to a second source identified by a second source identifier instead of the first source identifier. The second source identifier is different than the first source identifier, and the second source provides data for the IPTV channel and was selected as a recipient of the second join request message based upon a service bit rate of the first subscriber.

According to some embodiments, a subscriber can thus be provided with a requested IPTV channel from a most appropriate source (e.g., at a most appropriate bit rate) for that subscriber despite the subscriber requesting the IPTV channel from a different source. In some embodiments, user interfaces may thus be provided with a single user interface element for each channel, and thus, need not present several user interface elements for a same channel that are for different bit rates (or quality levels). In some embodiments, client devices (or "user equipment" devices) of an IPTV system—which can include tens, hundreds, thousands, tens of thousands or more of devices—do not need to be updated to utilize new IPTV source addresses when one (or more) source addresses for one or more IPTV channels change. Instead, source address updates may instead be performed at only a few routers, which can perform the multicast service translation.

BRIEF DESCRIPTION OF THE DRAWINGS

The invention may best be understood by referring to the following description and accompanying drawings that are used to illustrate embodiments of the invention. In the drawings:

FIG. 8C illustrates various exemplary ways in which virtual network elements (VNEs) may be coupled according to some embodiments.

FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8E illustrates the simple case of where each of the NDs implements a single NE, but a centralized control plane has abstracted multiple of the NEs in different NDs into (to represent) a single NE in one of the virtual network(s), according to some embodiments.

FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

DESCRIPTION OF EMBODIMENTS

Figure 1:
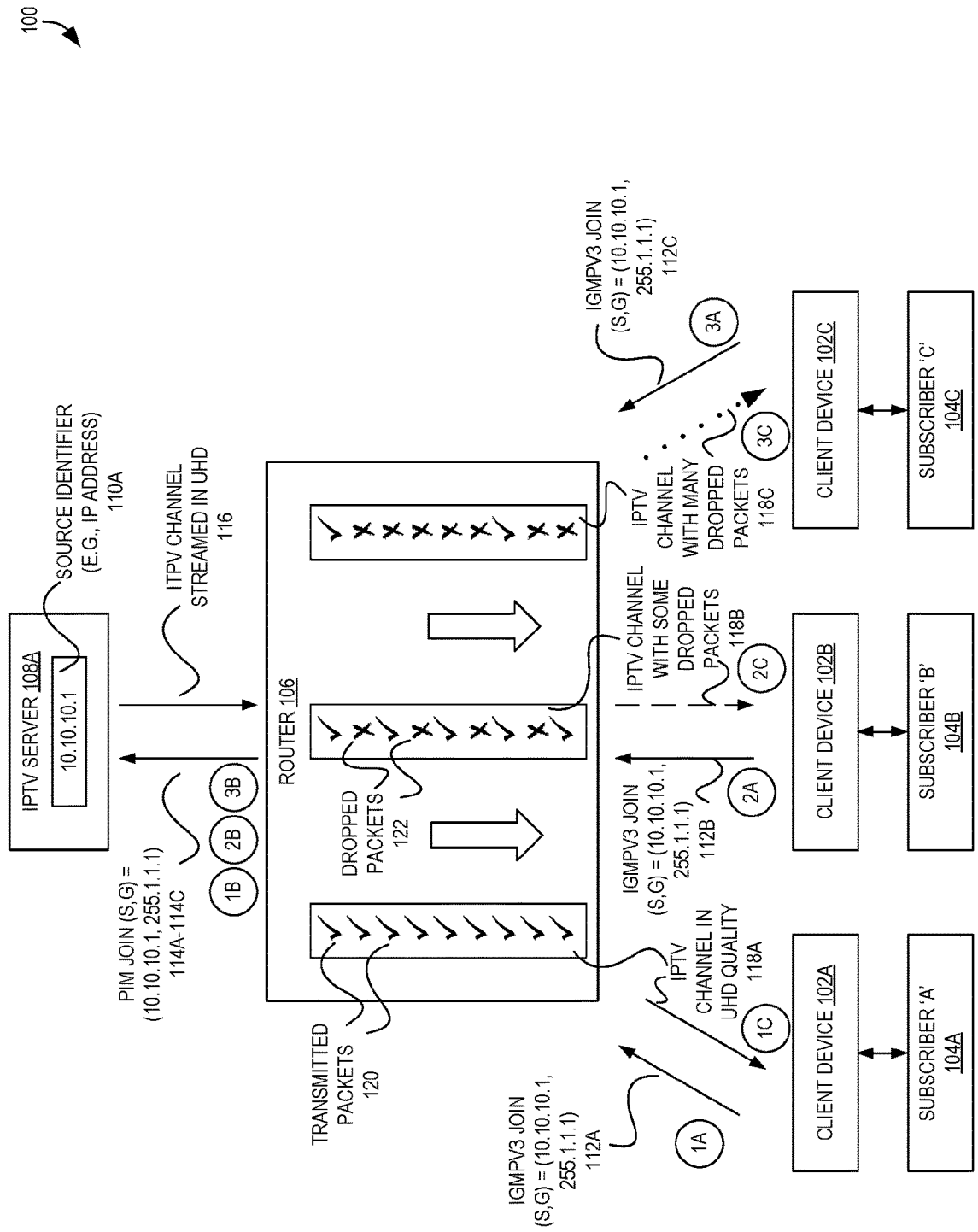
FIG. 1 is a high-level block diagram of a traditional Internet Protocol Television (IPTV) system illustrating network problems resulting from quality mismatches.

The following description describes methods and apparatus for multicast service translation. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques are described for multicast service translation. According to some embodiments, a router can provide access to a particular source for an Internet Protocol Television (IPTV) channel that is most appropriate for the subscriber, despite the subscriber requesting the IPTV channel from potentially a different, less appropriate source. In some embodiments, the most appropriate source can be identified based upon a bit rate (or quality of service (QoS)) associated with the subscriber, a location of the subscriber and/or IPTV servers providing the IPTV channel, etc. In some embodiments, the router can receive a request to join a multicast stream from a client device of the subscriber that identifies a source of an IPTV channel, and identify a different source of the IPTV channel to be used to then transmit a different join request towards the difference source.

Accordingly, in some embodiments a router can perform multicast service adaptation such that the subscriber can be provided a requested IPTV channel from a most appropriate source (e.g., providing a most appropriate bit rate for that subscriber, etc.), perhaps without the subscriber and/or source knowing of the adaptation on the part of the router. Thus, in some embodiments, user interfaces may thus be provided with a single user interface element for each channel, and thus, there is not a need to present several user interface elements that are for different bit rates (or quality levels, locations, etc.) for a same channel. In some embodiments, the client devices of an IPTV system—which can include tens, hundreds, thousands, tens of thousands or more of devices—may not need to be updated to utilize new IPTV source addresses when one (or more) source addresses for one or more IPTV channels change. Instead, source address updates may instead be performed at only a few routers, which can thereby perform the multicast service translation disclosed herein.

FIG. 1 is a high-level block diagram of a traditional IPTV system 100 illustrating network problems resulting from quality mismatches. As illustrated in FIG. 1, the system 100 includes an IPTV server 108A (also referred to as a content server), a router 106, multiple client devices 102A-102C (also referred to as customer premise equipment (CPE)), and multiple subscribers 104A-104C. A particular client device 102A and/or corresponding subscriber 'A' 104A can be located within the subscriber's home, though the client device 102A could also be a mobile device, etc., and thus the client device 102A and/or subscriber 104A could be located elsewhere.

In some embodiments, one or more of the client devices 102A-102C can be an IPTV set-top-box capable of receiving IPTV multicast streams from the IPTV server 108A via the router 106 over a network. In other embodiments, the client devices 102A-102C can be any type of device that is capable of receiving IPTV multicast streams including desktops, laptops, mobile devices, tablets, server computing devices (also known as server end stations), and similar devices. In some embodiments, the client devices 102A-102C can provide all necessary signal processing and decoding functionality for displaying multicast streams on a display, which may be part of the client device or communicatively coupled with the client device (e.g., using wireless or wired techniques known to those of skill in the art). In some embodiments, the functionality of the client devices 102A-102C can be integrated into a display (e.g., into a television) or integrated into a residential gateway or similar network device. In some embodiments, the client devices 102A-102C may accept commands from the subscriber (e.g., via a user input, such as through a remote control button press, voice command, gesture, touch input, etc.) and transmit these commands to a network device implementing the router 106. For example, a client device 102A may accept a command from a subscriber to switch to a particular IPTV channel, and the client device 102A may then responsively transmit a request for that IPTV channel to the router 106.

The network or networks of the client device 102A, router 106, and/or IPTV server 108A can be wired or wireless networks or any combination of wired and/or wireless networks. Moreover, additional devices such as routers, servers, or other network devices may be included as part of the network(s) to achieve the transmission of data between the IPTV server 108A and the subscriber's client device 102A.

In some embodiments, the client devices 102A-102C may be connected to the IPTV server 108A through a network device implementing the router 106. In some embodiments, the network device is a Broadband Remote Access Server (BRAS) or a Broadband Network Gateway (BNG) or other type of provider edge (PE) router device. The router 106 can be capable of managing multicast group membership information for subscribers. For example, the router 106 can accept requests from subscribers 104A-104C to join and leave multicast groups.

In some embodiments, the router 106 implements the Internet Group Management Protocol (IGMP) for managing multicast group membership in an Internet Protocol Version 4 (IPv4) network. In some embodiments, the router 106 implements Multicast Listener Discovery (MLD) for managing multicast group membership in an Internet Protocol Version 6 (IPv6) network. The router 106 may also implement a multicast routing protocol for establishing multicast distribution trees and forwarding multicast data to recipients. In some embodiments, the router 106 implements Protocol Independent Multicast (PIM) as the multicast routing protocol.

In some embodiments, a subscriber's home can include a residential gateway (not illustrated) that connects the client device 102A and other computing devices within the subscriber home to the router 106. The client device 102A and other computing devices may connect to the residential gateway through a wired or wireless connection. In some embodiments, a Digital Subscriber Line Access Multiplexer (DSLAM) (not shown) aggregates traffic from multiple subscriber homes and forwards the traffic to the router 106. In some embodiments, the functionality of the DSLAM and the router 106 are implemented by separate network devices, while in other embodiments, the functionality of the DSLAM and the router 106 are implemented by a single network device.

The IPTV server 108A is adapted to transmit IPTV multicast streams for one or more IPTV channels over the network. For example, FIG. 1 depicts an IPTV channel 116 that is streamed in ultra-high definition (UHD) quality (e.g., a comparatively high bit rate stream). Each IPTV multicast stream can be forwarded from the IPTV server 108A to respective multicast group members according to routing paths established by a multicast routing protocol (e.g., PIM). The IPTV multicast streams transmitted by the IPTV server 108A can include video, graphics, audio, and/or other types of multimedia content.

In this system 100, each of the client devices 102A-102C, to play an IPTV channel 116, is configured to transmit an IGMP version 3 (IGMPv3) Join message (or "report") 112A-112C (at circles '1A', '2A', and '3A') with a particular source (S) identifier and a group (G) identifier. As illustrated, each message 112A-112C includes a same (S, G) pair where the source identifier for the IPTV channel is "10.10.10.1" and the group identifier is "255.1.1.1".

Responsive to receipt of each of these IGMPv3 join messages 112A-112C, the router 106 transmits corresponding PIM join messages (at circles '1B', '2B' and '3B') that similarly include the same source identifier and group identifier as in the IGMP join messages 112A-112C—"10.10.10.1" and "255.1.1.1" 114A-114C—destined to the IPTV server 108A utilizing (e.g., assigned or associated with) that source identifier 110A.

In this example, each of the subscribers 104A-104C has a different quality of service. For example, a service provider (e.g., an Internet Service Provider) providing access to the IPTV channel, Internet (e.g., through the router 106), etc., may configure its network (e.g., router 106) to provide a particular quality (e.g., bandwidth amount) for the subscribers.

In this example, we assume that the first subscriber 'A' 104A has an "ultra-high" (or "gold") quality of service, thus allowing the subscriber 104A to be able to view ultra-high definition quality IPTV streams (e.g., IPTV channel 116) without any degradation. In contrast, the second subscriber 'B' 104B has a "medium" (or "silver") quality of service, allowing the subscriber 104B to view high definition IPTV streams without any degradation, while allowing somewhat degraded viewing of ultra-high IPTV streams. Additionally, we assume that the third subscriber 'C' 104C has a "low" (or "bronze") quality of service, allowing the subscriber 104C to view standard definition IPTV streams without any degradation, while allowing somewhat degraded viewing of high IPTV streams and more degraded (possibly significantly degraded) viewing of ultra-high IPTV streams.

Thus, with the traffic of the IPTV channel streamed in UHD 116, the router 106 may enforce the quality of service levels for each of the subscribers 104A-104C. In this case, because the first subscriber 'A' 104A has the ultra-high quality of service, all of the data (as packets 120) of the IPTV channel 116 will be transmitted by the router 106 to the client device 102A (represented by the checkmarks), and thus the IPTV channel in UHD quality 118A (at circle '1C') will be successfully provided to the subscriber.

In contrast, for the second subscriber 'B' 104B having the medium quality of service, some of the packets will be dropped 122 (illustrated as "X" marks), resulting in the IPTV channel being provided with some dropped packets 118B at circle '2C'. As a result, the viewing quality of the UHD quality channel is significantly degraded, perhaps with video and/or frames missing, etc.

Further, for the third subscriber 'C' 104C having the low quality of service, even more of the packets will be dropped (compared to that for subscriber 'B' 104B), resulting in the IPTV channel being provided with comparatively more dropped packets 118C at circle '3C'. As a result, the viewing quality of the UHD quality channel is even more significantly degraded (compared to that for subscriber 'B' 104B), likely with missing audio and/or visual frames, etc., and the IPTV channel potentially may not be watchable. Embodiments described below can remedy these problems and some embodiments can provide other benefits as well.

Figure 2:
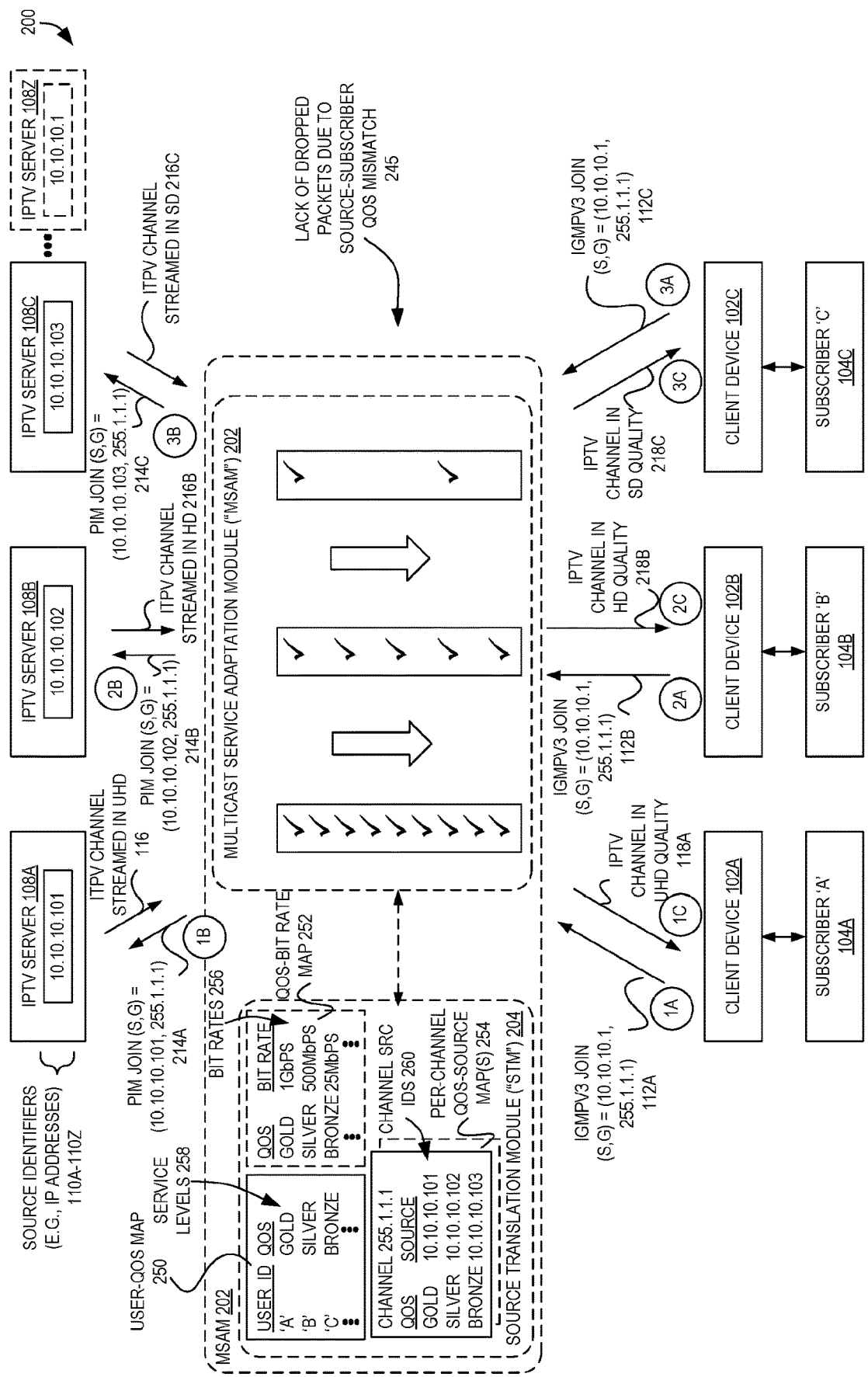
FIG. 2 is a high-level block diagram illustrating an IPTV system including a multicast service adaptation module for multicast service translation according to some embodiments.

Thus, FIG. 2 is a high-level block diagram illustrating an IPTV system 200 including a multicast service adaptation module for multicast service translation according to some embodiments. This depicted embodiment can prevent the degraded IPTV channel presentation by adapting multicast service as follows, which can result in a lack of dropped packets due to source-subscriber quality of service mismatches 245.

Similar to FIG. 1, we assume the subscribers 104A-104C have the same service levels (e.g., "gold" and "silver" and "bronze", respectively), and that each of the client devices 102A-102C issue the same IGMPv3 join request messages 112A-112C for the same source "10.10.10.1" and group "255.1.1.1."

However, upon receipt of these IGMPv3 join request messages 112A-112C, a multicast service adaptation module ("MSAM") 202 (which can be implemented by a router 106) can determine a new source for some or all of these requests, which can thus provide the requested IPTV channel in a more appropriate manner (e.g., from a source streaming the IPTV channel at a bit rate that is the same as or comparatively close to the service level bit rate of the particular subscriber).

For example, in the depicted embodiment, the MSAM 202 can utilize data from a user-QoS map 250, QoS-bit rate map 252, and/or one or more per-channel QoS-source maps 254 to, for a particular IGMPv3 request with a source identifier, identify a different source identifier to be used in a PIM join message to a different source. These maps 250/252/254 can be utilized by a source translation module ("STM") 204 that can be distinct from the MSAM 202 (e.g., as a separate software module, as separate circuitry, as a separate device, etc.), but in some embodiments the STM 204 and/or maps 250/252/254 can be part of the MSAM 202.

The user-QoS map 250 can implement a mapping between user (or subscriber) identifiers and service levels 258. In this example, subscribers 'A' 104A, 'B' 104B, and 'C' 104C are mapped to "gold," "silver," and "bronze," respectively.

The QoS-bit rate map 252 can implement a mapping between service levels and bit rates 256—here, we designate "gold" as being 1 gigabit/second (Gbps), "silver" as being 500 megabits/second (Mbps), and "bronze" as being 25 Mbps. Of course, these levels and bit rates 256 are illustrative and thus many different types/names of levels can be implemented, and many different types/names of bit rates can be implemented.

The per-channel QoS-source map(s) 254 can implement a mapping between service levels and source identifiers 260 for a particular channel identifier. As illustrated, for a particular channel "255.1.1.1", the channel is provided at the gold service level (e.g., at or about 1 Gbps) from source identifier "10.10.10.101"; at the silver service level (e.g., at or about 500 Mbps) from "10.10.10.102"; and at the bronze service level (e.g., at or about 25 Mbps) from "10.10.10.103".

Notably, in various embodiments this "mapping" information illustrated in these three maps 250/252/254 can be placed in a different amount of maps (e.g., one, two). Additionally, in embodiments where this mapping data is provided in software, the data can be maintained in a variety of different data structures. Thus, these particular illustrated structures and data layouts are exemplary.

Thus, upon receipt of the first IGMPv3 join message 112A, the MSAM 202 can determine a QoS of the first subscriber 'A' 104A (e.g., using a circuit identifier of a circuit upon which the IGMPv3 join message 112A was received, using a source IP address of the IGMPv3 join message 112A, etc.) and can thus determine a source for the corresponding PIM join message 214A based upon the determined QoS and the source identifier from the IGMPv3 join message 112A (e.g., to identify which per-channel QoS-source map 254 mapping to utilize). Because subscriber 'A' 104A has the "gold" service level, the determined new source is "10.10.10.101." Thus, the PIM join 214A will be sent toward the first IPTV server 108A that is determined as the new source (e.g., identified by the address "10.10.10.101" in the per-channel QoS-source map 254) (at circle '1B'), which provides the IPTV channel 116 in UHD, where no packets are dropped and the IPTV channel 118A in UHD quality is actually provided to the client device 102A at circle '1C'.

Upon receipt of the second IGMPv3 join message 112B, the MSAM 202 can determine a QoS of the second subscriber 'B' 104B and can thus determine a source for the corresponding PIM join message 214B based upon the determined QoS and the source identifier from the IGMPv3 join message 112B. Because subscriber 'B' 104B has the "silver" service level, the determined new source is "10.10.10.102." Thus, the PIM join 214B will be sent toward the second IPTV server 108B that is determined as the new source (e.g., identified by the address "10.10.10.102" in the per-channel QoS-source map 254) (at circle '2B'), which provides the IPTV channel 216B in High Definition (HD), where no packets are dropped and the IPTV channel in HD quality 218B is actually provided to the client device 102B at circle '2C'.

Similarly, upon receipt of the third IGMPv3 join message 112C, the MSAM 202 can determine a QoS of the third subscriber 'C' 104C and can thus determine a source for the corresponding PIM join message 214C based upon the determined QoS and the source identifier from the IGMPv3 join message 112C. Because subscriber 'C' 104C has the "bronze" service level, the determined new source is "10.10.10.103." Thus, the PIM join 214C will be sent toward the third IPTV server 108C that is determined as the new source (e.g., identified by the address "10.10.10.103" in the per-channel QoS-source map 254) (at circle '3B'), which provides the IPTV channel 216C in Standard Definition (SD), where no packets are dropped and the IPTV channel in SD quality 218C is actually provided to the client device 102C at circle '3C'.

Notably, in this example, a same (or similar) amount of packets will actually be provided to each of the client devices 102A-102C as compared to the system depicted in FIG. 1. However, it is important to distinguish that the particular format of the data of each stream 116/216B/216C can be different—e.g., carry a different quality of video—and thus, the same channel is being provided to each subscriber in a quality that is appropriate based upon their service plan. Thus, subscriber 'C' 104C may receive fewer packets for the IPTV channel in SD quality 218C, but that SD quality is being provided correctly. For example, the client device 102C in FIG. 2 may play the channel "smoothly" with 60 frames a second (where each frame is of a "medium" quality), whereas in FIG. 1 the client device 102C may only play the channel at 2 frames a second (albeit at a very high quality), which is distracting and likely non-watchable.

Additionally, in this example, there is not a source providing the IPTV channel using the source identifier (10.10.10.1) from the IGMPv3 join messages 112A-112C. Thus, for this example, the source identifier "10.10.10.1" is associated with the IPTV channel as a placeholder identifier that does not identify any actual source of the IPTV channel (i.e., a placeholder identifier for an apparent, but not an actual, source of the IPTV channel). However, this need not be the case, and in some embodiments one of the IPTV servers (e.g., IPTV server 108A) could instead use "10.10.10.1" as a source identifier. That is, in this example, the source identifier "10.10.10.1" is associated with the IPTV channel as an actual identifier for a source (e.g., IPTV server 108A) of the IPTV channel. In this case, the source identifier from the first IGMPv3 join would not end up changing in the PIM join message 214A ultimately sent by the MSAM 202, though the other PIM joins 214B-214C may still be adapted (or "translated") as depicted herein.

Figure 3:
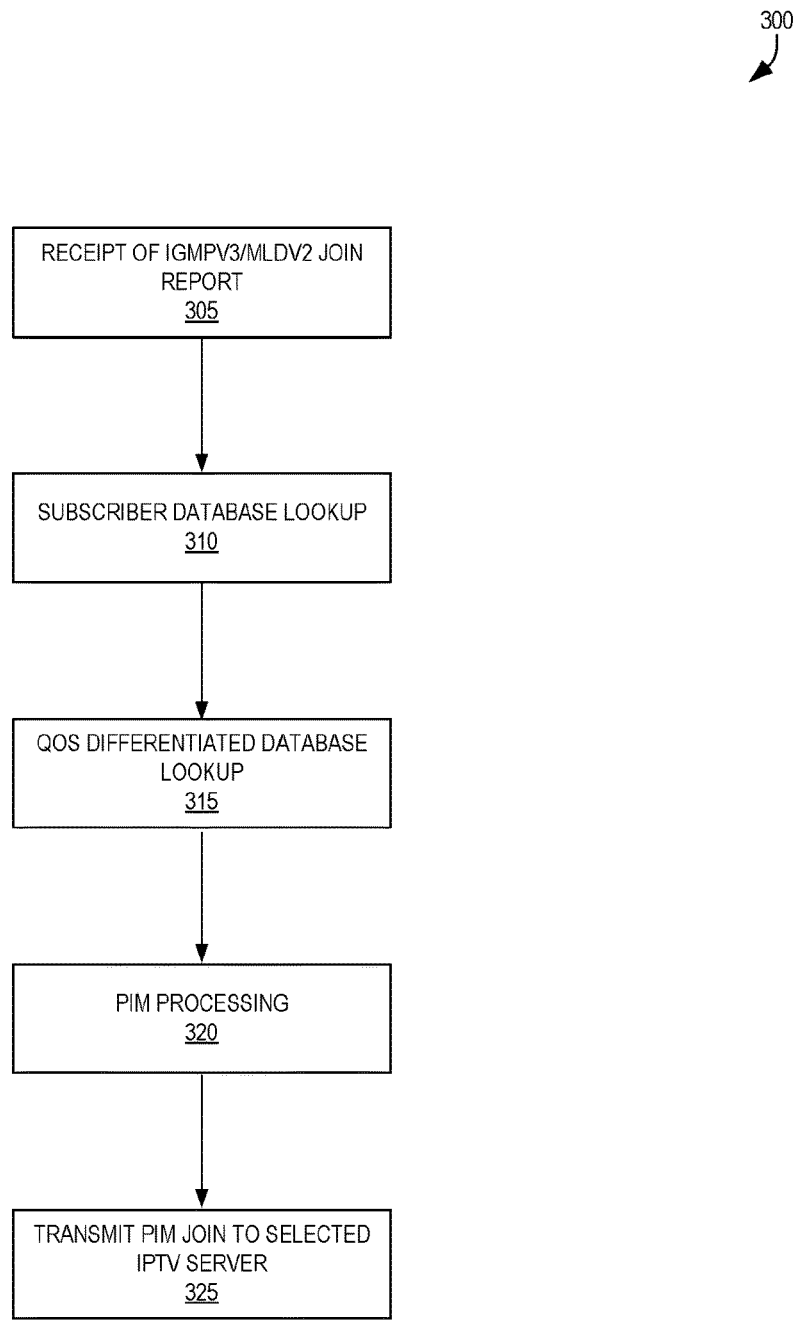
FIG. 3 is a flow diagram illustrating a flow for multicast service translation according to some embodiments.

For a high-level perspective of the operations, we turn to FIG. 3, which is a flow diagram illustrating a flow 300 for multicast service translation according to some embodiments.

The operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

At block 305, the flow 300 includes a receipt of an IGMPv3 (e.g., for IPv4) or MLDv2 (e.g., for IPv6) join report (or, join request message). This block 305 can be performed by the MSAM 202, which can be implemented by a (router) network device, or can be performed by another module of a router and passed to the MSAM 202.

At block 310, a subscriber "database" lookup can be performed, which may occur locally (e.g., using data stored by the MSAM 202 or by another entity upon a same device as the MSAM 202) or remotely (e.g., sending a request or query to another module or device). In some embodiments, a subscriber record (e.g., including a service level indicator) can thereafter be received at the MSAM 202, but in other embodiments nothing is received by the MSAM 202 until after block 315. In some embodiments, block 310 includes performing a lookup in a user-QoS map 250.

At block 315, a QoS differentiated database lookup is performed. In some embodiments, the MSAM 202 performs a lookup in a per-channel QoS-source map 254 using a QoS identified in block 310 and a channel identifier from the received message of block 305 to identify the source identifier to be used in a subsequent PIM join. However, in some embodiments, the MSAM 202 instead issues a request or query for the new source identifier to a separate entity/device (e.g., the STM 204), and the request/query may include a subscriber service level identifier (from block 310) and/or IPTV channel identifier (e.g., a source or group identifier from the join received in block 305).

Thereafter, at block 320, PIM processing can occur, which can include creating a PIM join message using the determined source identifier from block 315. At block 325, the PIM join message can be transmitted to the corresponding IPTV server.

Figure 4:
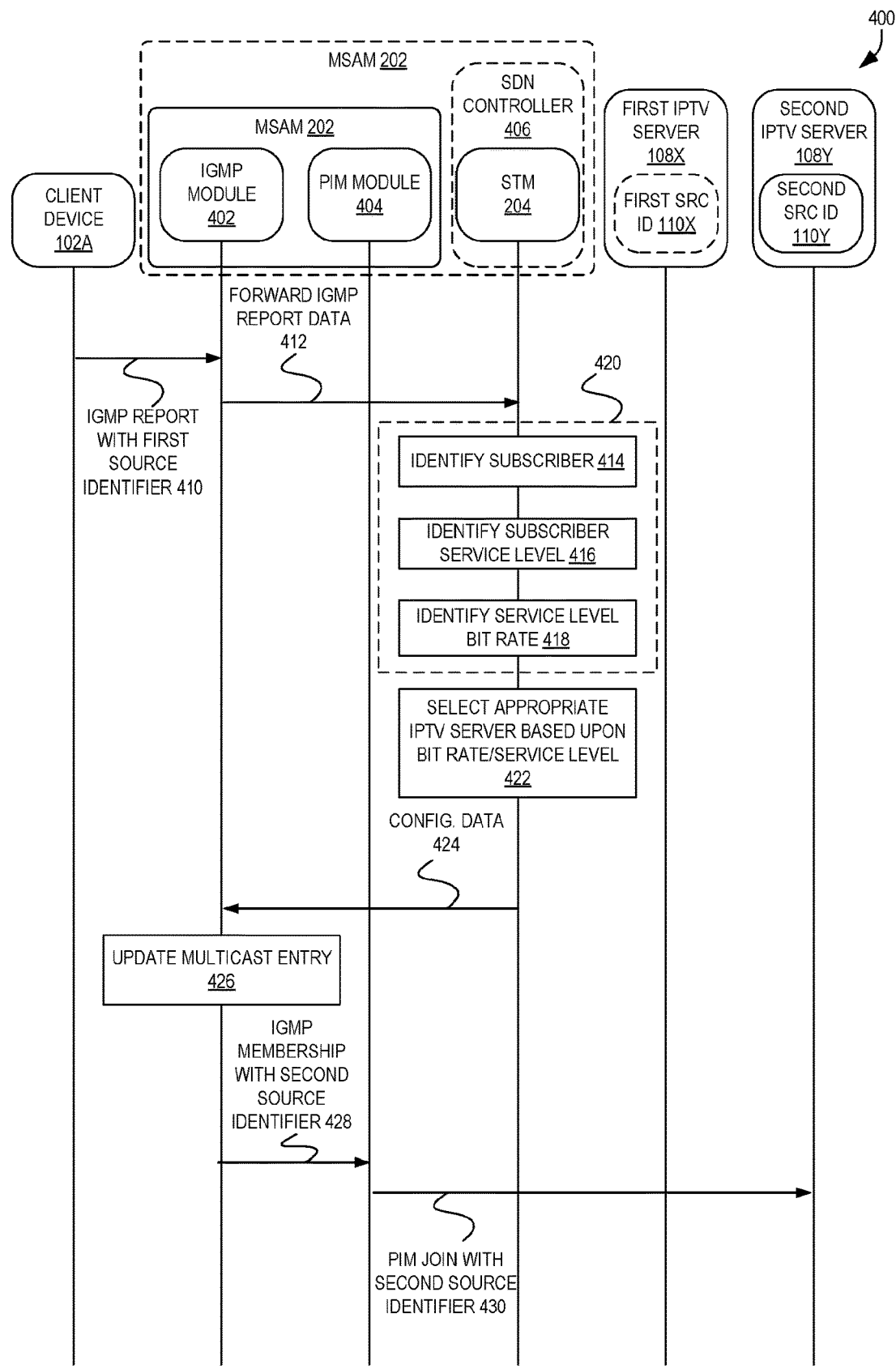
FIG. 4 is a combined flow and sequence diagram illustrating messages and operations for multicast service translation according to some embodiments.

For additional detail, FIG. 4 is a combined flow and sequence diagram illustrating messages and operations in a system 400 for multicast service translation according to some embodiments. In this example, a client device 102A of a subscriber (e.g., subscriber 104A) transmits an IGMP report 410 with a first source identifier 110X of a first IPTV server 108X, which is received by an IGMP module 402 (e.g., implementing IGMP protocol functionality for the MSAM 202), which then forwards on some IGMP report data 412 to the STM 204, which may be from the IGMP report 410, and may also include additional data supplemented by the IGMP module 402 (e.g., some form of data useful in determining the identity of the subscriber, such as a circuit identifier, etc.).

In some embodiments, the STM 204 is part of a Software Defined Networking (SDN) controller 406, but in some embodiments the STM 204 can be part of the MSAM 202. The STM 204 can perform operations 420 responsive to receipt of the forwarded IGMP report data 412, including identifying 414 the subscriber (e.g., using a source IP address from the IGMP report 410, using a circuit identifier from the forwarded IGMP report data 412, etc.), identifying 416 the subscriber's service level (e.g., from data within a subscriber record), and identifying 418 the service level bit rate of the subscriber (e.g., from data within a subscriber record). Of course, in other embodiments, one or more of these operations 420 may not be performed, be performed in a different order, or performed differently to achieve a same result—i.e., identification of a service level of the subscriber.

At block 422, the STM 204 can select an appropriate IPTV server (or, IPTV source identifier) based upon the identified bit rate/service level of the subscriber. In this case, we assume that the source identifier is a second source identifier 110Y of the second IPTV server 108Y.

The STM 204 then transmits back configuration data 424 to the IGMP module 402. In some embodiments, this configuration data 424 includes the selected source identifier, and in some embodiments can comprise the SDN controller 406 configuring forwarding structures/maps.

At block 426, the IGMP module 402 can update its multicast entry for the client device 102A and/or source identifier such that subsequent traffic between the two can be quickly processed/forwarded appropriately.

The IGMP 402 can then provide 428 an IGMP membership message with the second source identifier 110Y to a PIM module 404 implementing a PIM protocol for the MSAM 202. Thereafter, the PIM module 404 can transmit 430 a PIM join message with the second source identifier 110Y—and not the first source identifier 110X of the IGMP report 410—toward the second IPTV server 108Y. Thereafter, the data for the IPTV channel sent by the second IPTV server 108Y can be provided to the client device 102A, which will be more appropriate (e.g., at a bit rate closer to that of the service level of the subscriber, from a geographically closer location, etc.) than if the first IPTV server 108X had been used as the source.

Figure 5:
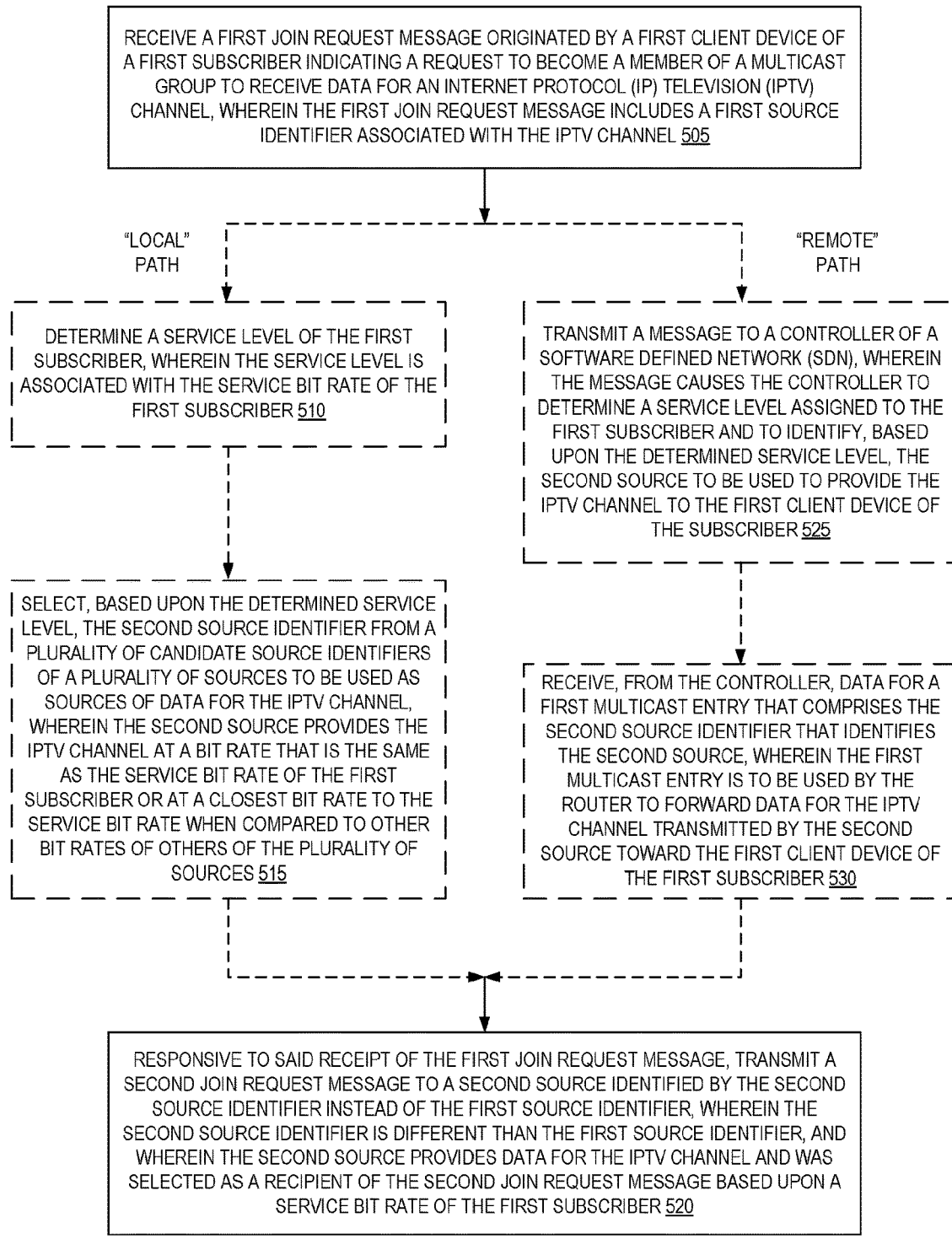
FIG. 5 is a flow diagram illustrating a flow for multicast service translation according to some embodiments.

FIG. 5 is a flow diagram illustrating a flow 500 for multicast service translation according to some embodiments. FIG. 5 illustrates two paths of operation, based upon whether certain mapping information is available locally or remotely. In some embodiments, the MSAM 202 of FIG. 2 may perform these blocks.

At block 505, the flow 500 includes receiving a first join request message (e.g., an IGMPv3 join report message, an MLDv2 join report message) originated by a first client device of a first subscriber indicating a request to become a member of a multicast group to receive data for an IPTV channel. The first join request message includes a first source identifier associated with the IPTV channel. For example, the first source identifier may be an actual identifier for a source of the IPTV channel or a placeholder identifier that does not identify any actual source of the IPTV channel (i.e., a placeholder identifier for an apparent, but not an actual, source of the IPTV channel as discussed above with reference to FIG. 2).

Under a local path, the flow 500 includes block 510 and determining a service level of the first subscriber. The service level is associated with the service bit rate of the first subscriber. Continuing the local path, the flow 500 includes block 515 and selecting, based upon the determined service level, the second source identifier from a plurality of candidate source identifiers of a plurality of sources to be used as sources of data for the IPTV channel. The second source provides the IPTV channel at a bit rate that is the same as the service bit rate of the first subscriber or at a closest bit rate to the service bit rate when compared to other bit rates of others of the plurality of sources. Next, at block 520, the flow 500 includes, responsive to the receipt of the first join request message, transmitting a second join request message (e.g., a PIM join) to a second source identified by the second source identifier instead of the first source identifier. The second source identifier is different than the first source identifier, and the second source provides data for the IPTV channel and was selected as a recipient of the second join request message based upon a service bit rate of the first subscriber.

Under the remote path, block 525 and block 530 are performed. Block 525 includes transmitting a message to a controller of a SDN network, where the message causes the controller to determine a service level assigned to the first subscriber and to identify, based upon the determined service level, the second source to be used to provide the IPTV channel to the first client device of the subscriber. Block 530 includes receiving, from the controller, data for a first multicast entry that comprises the second source identifier that identifies the second source, where the first multicast entry is to be used (e.g., by a router implementing the MSAM 202) to forward data for the IPTV channel transmitted by the second source toward the first client device of the first subscriber. The flow may then continue to block 520, just as in the local path.

Figure 6:
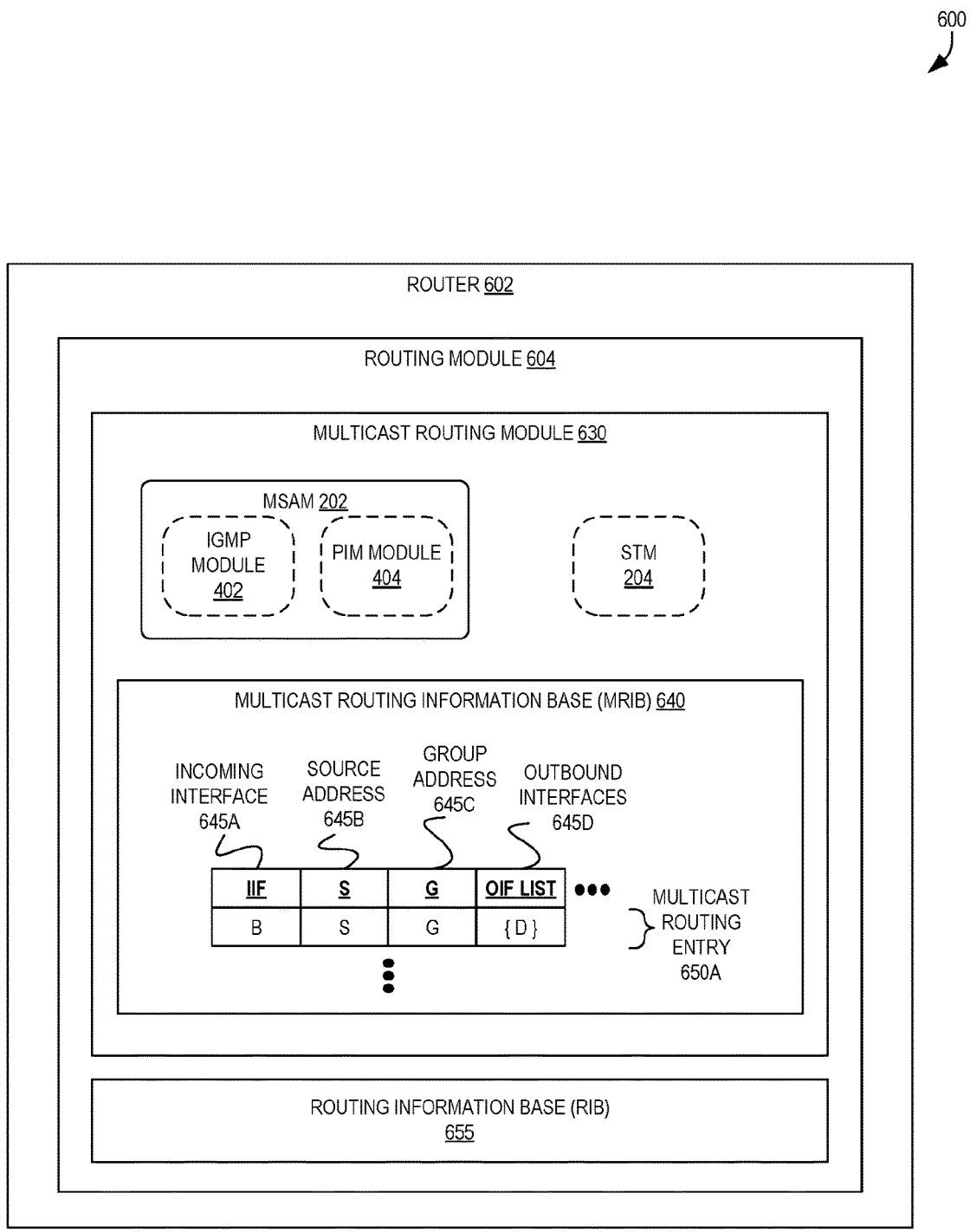
FIG. 6 is a block diagram illustrating a multicast service adaptation module of a router according to some embodiments.

For further detail regarding an implementation of the MSAM 202, FIG. 6 is a block diagram illustrating a MSAM 202 of a router 602 according to some embodiments. The router 602 can be implemented by a network device (described later herein), and include a routing module 604 (with a routing information base (RIB) 655), which can include a multicast routing module 630.

The multicast routing module 630 can include the MSAM 202 (potentially including an IGMP module 402 and/or PIM module 404 as described with regard to FIG. 4), an optional STM 204 (which could alternatively be remote from the router 602 or multicast routing module 630), and a multicast RIB ("MRIB") 640. The multicast RIB 640 can include one or more multicast routing entries (e.g., multicast routing entry 650A). Each multicast routing entry can identify, for example, an incoming interface 645A of the router 602, a source address 645B, a group address 645C, and a set of outbound interfaces 645D upon which to output traffic matching the other columns (incoming interface 645A, source address 645B, and/or group address 645C). In some embodiments, an entry of the MRIB can be added or configured after an adapted/translated source identifier is determined for a subscriber, such as at block 426, etc.

Figure 7:
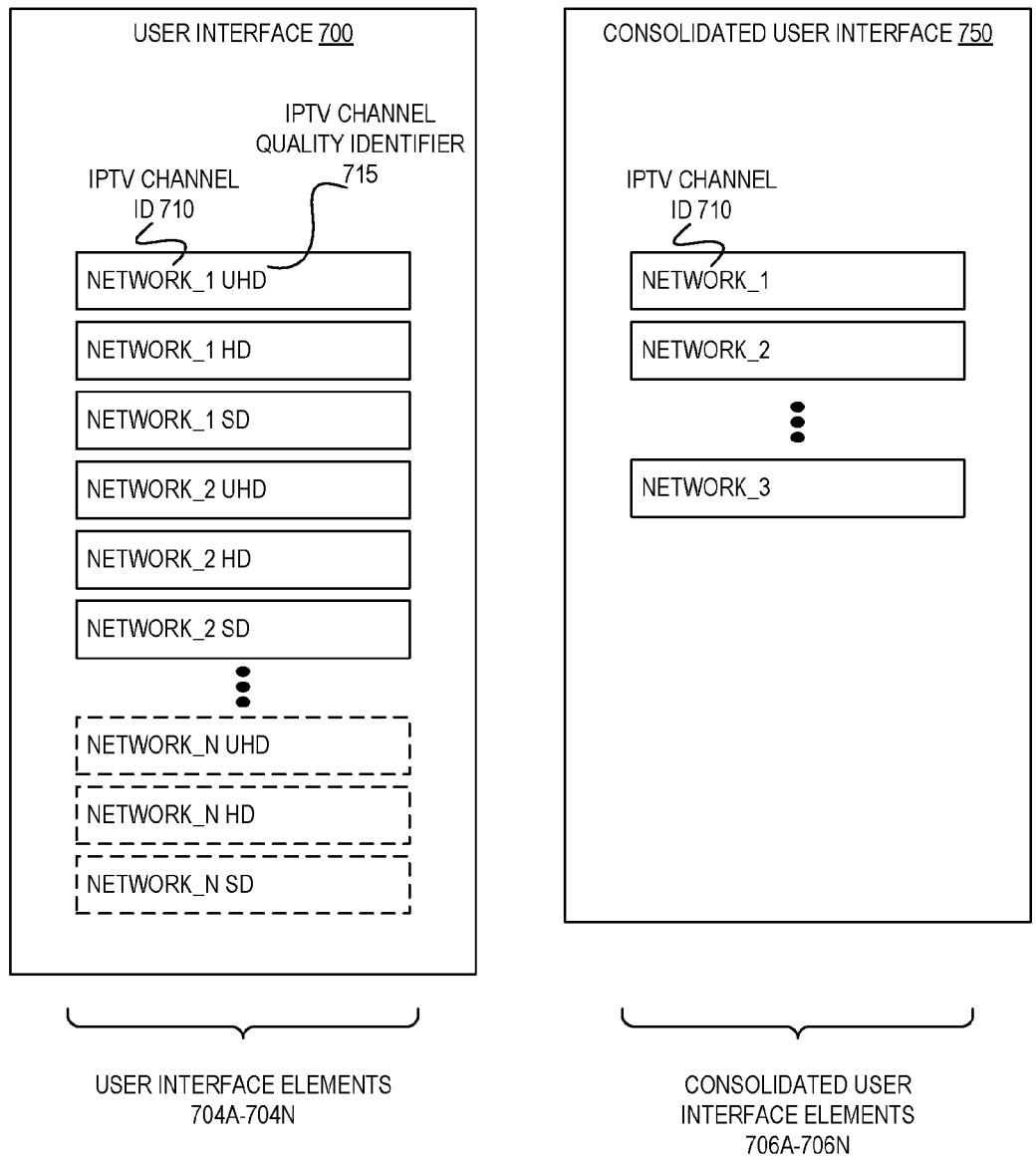
FIG. 7 is a diagram illustrating a user interface and a consolidated user interface according to some embodiments.

FIG. 7 is a diagram illustrating a user interface 700 and a consolidated user interface 750 according to some embodiments. As described earlier herein, in some embodiments the transmission of an IGMP join message by a client device occurs responsive to a subscriber attempting to view an IPTV channel. This can occur when a subscribers selects (e.g., provides a user input for) a user interface element, which can be caused to be displayed by the client device.

In traditional systems, to allow subscribers to self-select appropriate IPTV channel streams, the user interface 700 may be used that includes multiple user interface (UI) elements 704A-704N, where for a particular IPTV channel, multiple such UI elements may be provided to allow the user to select a particular quality. For example, a first UI element 704A may be for a first network (represented by an IPTV channel identifier (ID) 710 of "NETWORK_1") at a particular quality level (represented by an IPTV channel quality identifier 715 of "UHD"). In this example, there are three different UI elements 704A-704C for one IPTV channel. When some of the IPTV channels available to a subscriber have multiple quality options (and thus, multiple UI elements), the number of UI elements can become very large, making it time consuming, confusing, and/or difficult for a subscriber to use, resulting in frustration.

In contrast, using multicast service translation techniques disclosed herein, a consolidated user interface 750 can be utilized, where each IPTV channel needs to have only one consolidated UI element 706A-706N because the system can "self-select" the most appropriate quality level (and thus, the most appropriate source) for the particular subscriber. Thus, for the "NETWORK_1" IPTV channel identifier 710, only one UI element 706A is utilized.

Additionally, while embodiments have been described in relation to selecting a source providing an IPTV channel at a bit rate that is comparatively most appropriate for a subscriber, other embodiments can select different IPTV channel sources for different reasons, possibly using different techniques. For example, in some embodiments, a location of the subscriber could be utilized to select a source that is closest (according to geography, path(s) through a network, or another metric) to the subscriber.

Additionally, in some embodiments, these multicast service translation techniques can be utilized for other purposes. For example, some embodiments utilize these techniques to allow for system updates (e.g., new, updated, deleted, etc., IPTV channel sources) to only need to be performed in a limited number of locations—e.g., at the MSAMs 202 of a network, instead of at potentially a much larger number of client devices 102. Additionally, these multicast service translation techniques can be utilized to improve service stability by being able to quickly "re-route" IPTV channel traffic in the event of a system failure (e.g., of an IPTV source) to a different IPTV source. Therefore, embodiments are not limited to selecting a source providing an IPTV channel at a bit rate that is comparatively most appropriate for a subscriber.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 8A:
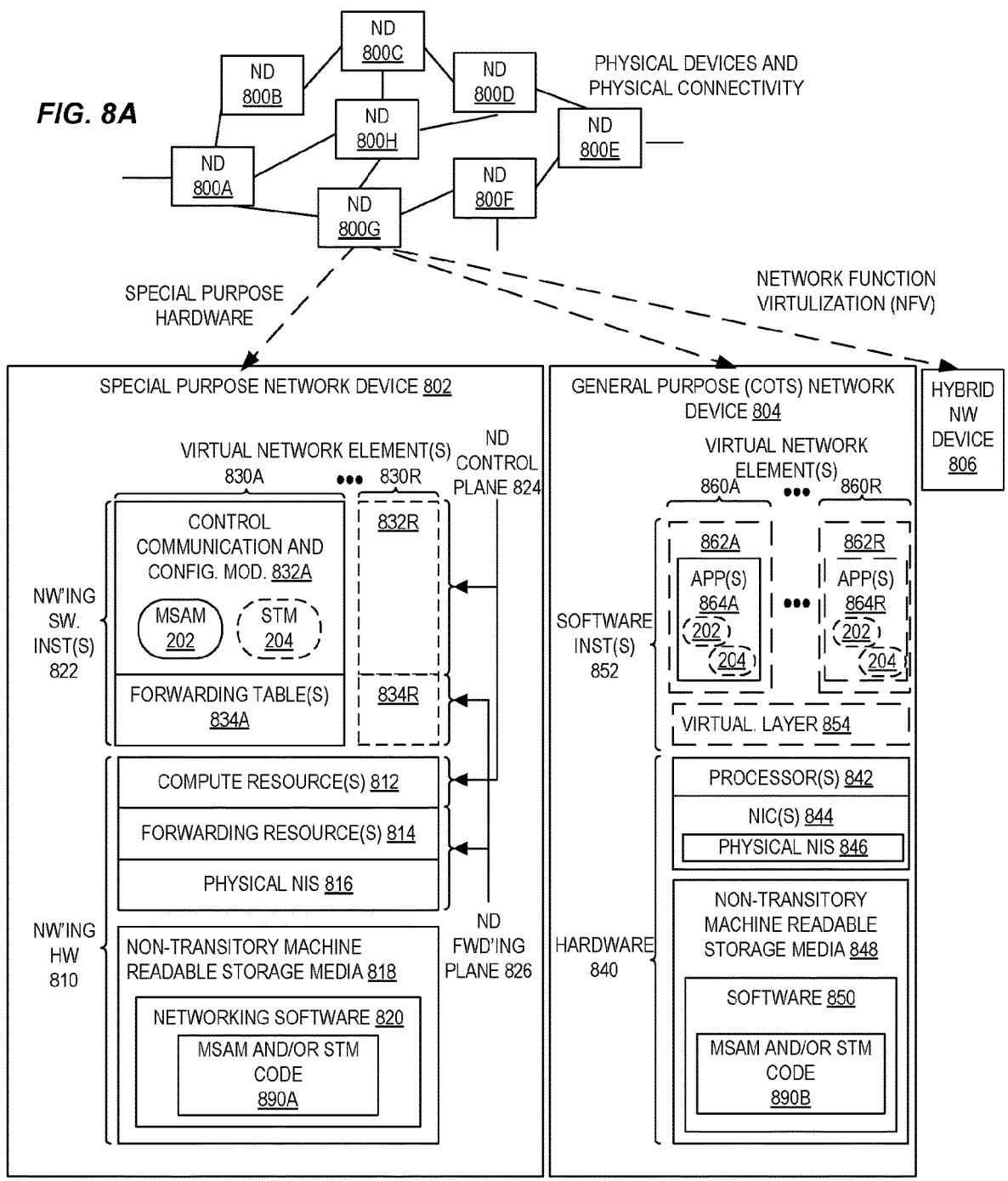
FIG. 8A illustrates connectivity between network devices (NDs) within an exemplary network, as well as three exemplary implementations of the NDs, according to some embodiments.

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a special-purpose operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-830R. Each of the virtual network element(s) (VNEs) 830A-830R includes a control communication and configuration module 832A-832R (sometimes referred to as a local control module or control communication module) and forwarding table(s) 834A-834R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

In some embodiments, the MSAM 202 and/or STM 204 implement the processes described herein above as part of the control communication and configuration module 832A or similar aspect of the networking software, which may be loaded and stored in the non-transitory machine readable media 818 (as MSAM and/or STM code 890A of networking software 820) or in a similar location.

The special-purpose network device 802 is often physically and/or logically considered to include: 1) a ND control plane 824 (sometimes referred to as a control plane) comprising the compute resource(s) 812 that execute the control communication and configuration module(s) 832A-832R; and 2) a ND forwarding plane 826 (sometimes referred to as a forwarding plane, a data plane, or a media plane) comprising the forwarding resource(s) 814 that utilize the forwarding table(s) 834A-834R and the physical NIs 816. By way of example, where the ND is a router (or is implementing routing functionality), the ND control plane 824 (the compute resource(s) 812 executing the control communication and configuration module(s) 832A-832R) is typically responsible for participating in controlling how data (e.g., packets) is to be routed (e.g., the next hop for the data and the outgoing physical NI for that data) and storing that routing information in the forwarding table(s) 834A-834R, and the ND forwarding plane 826 is responsible for receiving that data on the physical NIs 816 and forwarding that data out the appropriate ones of the physical NIs 816 based on the forwarding table(s) 834A-834R.

Figure 8B:
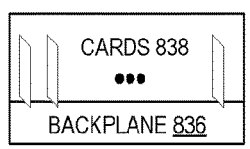
FIG. 8B illustrates an exemplary way to implement a special-purpose network device according to some embodiments.

FIG. 8B illustrates an exemplary way to implement the special-purpose network device 802 according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (or "NICs"; also known as network interface cards) (which include physical NIs 846), as well as non-transitory machine readable storage media 848 having stored therein software 850.

The software 850 can include MSAM and/or STM code 890B that, when executed, implement the processes described herein above. During operation, the processor(s) 842 execute the software 850 to instantiate one or more sets of one or more applications 864A-864R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-862R called software containers that may each be used to execute one (or more) of the sets of applications 864A-864R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-864R is run on top of a guest operating system within an instance 862A-862R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-862R, or as a combination of unikernels and the above-described techniques (e.g., unikernels and virtual machines both run directly on a hypervisor, unikernels and sets of applications that are run in different software containers).

The instantiation of the one or more sets of one or more applications 864A-864R (providing the MSAM 202 and/or STM 204), as well as virtualization if implemented, are collectively referred to as software instance(s) 852. Each set of applications 864A-864R, corresponding virtualization construct (e.g., instance 862A-862R) if implemented, and that part of the hardware 840 that executes them (be it hardware dedicated to that execution and/or time slices of hardware temporally shared), forms a separate virtual network element(s) 860A-860R.

The virtual network element(s) 860A-860R perform similar functionality to the virtual network element(s) 830A-830R—e.g., similar to the control communication and configuration module(s) 832A and forwarding table(s) 834A. This virtualization of the hardware 840 is sometimes referred to as Network Function Virtualization (NFV). NFV may be used to consolidate many network equipment types onto industry standard high volume server hardware, physical switches, and physical storage, which could be located in Data centers, NDs, and customer premise equipment (CPE). While embodiments are illustrated with each instance 862A-862R corresponding to one VNE 860A-860R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-862R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-862R and the NIC(s) 844, as well as optionally between the instances 862A-862R; in addition, this virtual switch may enforce network isolation between the VNEs 860A-860R that by policy are not permitted to communicate with each other (e.g., by honoring virtual local area networks (VLANs)).

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-830R, VNEs 860A-860R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 8C illustrates various exemplary ways in which VNEs may be coupled according to some embodiments. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, Global Positioning Satellite (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-862R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet Local Area Network (LAN) emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IP VPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments. Specifically, FIG. 8D illustrates network elements (NEs) 870A-870H with the same connectivity as the NDs 800A-800H of FIG. 8A.

FIG. 8D illustrates that the distributed approach 872 distributes responsibility for generating the reachability and forwarding information across the NEs 870A-870H; in other words, the process of neighbor discovery and topology discovery is distributed.

For example, where the special-purpose network device 802 is used, the control communication and configuration module(s) 832A-832R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for Label Switched Path (LSP) Tunnels and Generalized Multi-Protocol Label Switching (GMPLS) Signaling RSVP-TE)) that communicate with other NEs to exchange routes, and then selects those routes based on one or more routing metrics. Thus, the NEs 870A-870H (e.g., the compute resource(s) 812 executing the control communication and configuration module(s) 832A-832R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-834R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates a centralized approach 874 (also known as Software Defined Networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-870H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-870H of the data plane 880 over the south bound interface 882 (which may use the OpenFlow protocol). Thus, the network intelligence is centralized in the centralized control plane 876 executing on electronic devices that are typically separate from the NDs. In some embodiments, the centralized reachability and forwarding information module 879 may include STM 204 and related software as described herein above.

As an example, where the special-purpose network device 802 is used in the data plane 880, each of the control communication and configuration module(s) 832A-832R of the ND control plane 824 typically include a control agent that provides the VNE side of the south bound interface 882. In this case, the ND control plane 824 (the compute resource(s) 812 executing the control communication and configuration module(s) 832A-832R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments, the control communication and configuration module(s) 832A-832R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-860R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments, the VNEs 860A-860R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-870H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-800H implements a single NE 870A-870H, it should be understood that the network control approaches described with reference to FIG. 8D also work for networks where one or more of the NDs 800A-800H implement multiple VNEs (e.g., VNEs 830A-830R, VNEs 860A-860R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-800H implements a single NE 870A-870H (see FIG. 8D), but the centralized control plane 876 has abstracted multiple of the NEs in different NDs (the NEs 870A-870C and 870G-870H) into (to represent) a single NE 870I in one of the virtual network(s) 892 of FIG. 8D, according to some embodiments. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments. Thus, the abstraction of a NE or VNE can span multiple NDs.

While some embodiments implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
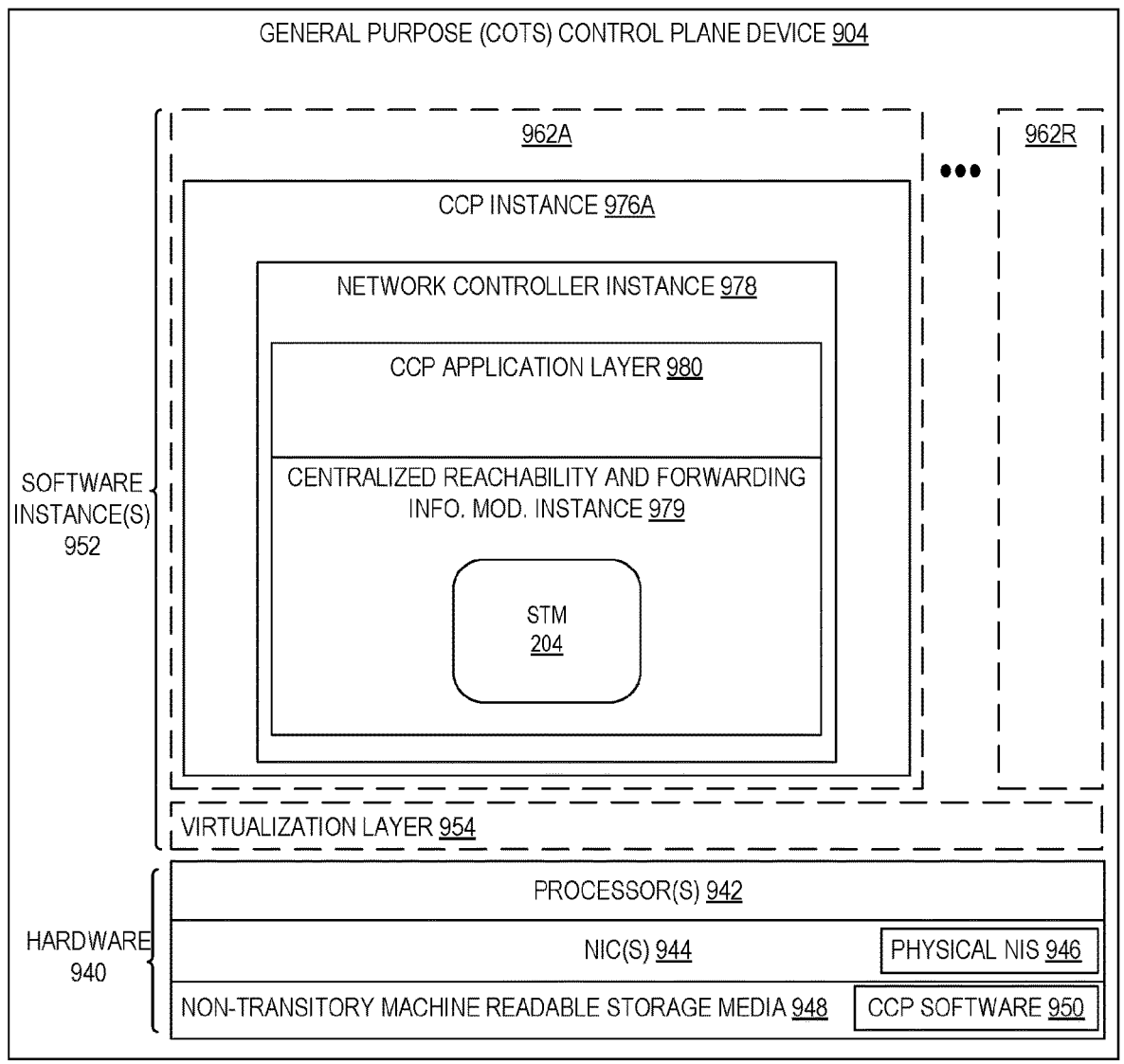
FIG. 9 illustrates a general purpose control plane device with centralized control plane (CCP) software 950), according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-962R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-962R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-962R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-962R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view. In some embodiments, the centralized reachability and forwarding information module instance 979 can include the STM 204 and related software as described herein above.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a router implemented by a device for multicast service translation, comprising:
    receiving, at the router, a first join request message originated by a first client device of a first subscriber indicating a request to become a member of a multicast group to receive data for an Internet Protocol (IP) television (IPTV) channel, wherein the first join request message includes a first source identifier associated with the IPTV channel; and
    responsive to said receiving the first join request message, transmitting, by the router, a second join request message to a second source identified by a second source identifier instead of the first source identifier, wherein the second source identifier is different than the first source identifier, and wherein the second source provides data for the IPTV channel and was selected as a recipient of the second join request message based upon a service bit rate of the first subscriber.

2. The method of claim 1, further comprising:
    after said receiving the first join request message:
        determining, by the router, a service level of the first subscriber, wherein the service level is associated with the service bit rate of the first subscriber; and
        selecting, by the router based upon the determined service level, the second source identifier from a plurality of channel source identifiers of a plurality of sources to be used as sources of data for the IPTV channel, wherein the second source provides the IPTV channel at a bit rate that is the same as the service bit rate of the first subscriber or at a closest bit rate to the service bit rate when compared to other bit rates of others of the plurality of sources.

3. The method of claim 1, further comprising:
    after said receiving the first join request message:
        transmitting, by the router, a message to a controller of a Software Defined Networking (SDN) network, wherein the message causes the controller to determine a service level assigned to the first subscriber and to identify, based upon the determined service level, the second source to be used to provide the IPTV channel to the first client device of the first subscriber; and
        receiving, by the router from the controller, configuration data for a first multicast entry that comprises the second source identifier that identifies the second source, wherein the first multicast entry is to be used by the router to forward data for the IPTV channel transmitted by the second source toward the first client device of the first subscriber.

4. The method of claim 1, wherein the first join request message is an Internet Group Management Protocol (IGMP) version 3 (IGMPv3) message or a Multicast Listener Discovery (MLD) version 2 (MLDv2) message, and wherein the second join request message is a Protocol Independent Multicast (PIM) join message.

5. The method of claim 1, further comprising:
receiving, at the router, a third join request message originated by a second client device of a second subscriber indicating a request to become a member of the multicast group to receive data for the IPTV channel, wherein the third join request message includes the first source identifier associated with the IPTV channel; and
transmitting, by the router, a fourth join request message to a third source identified by a third source identifier instead of the first source identifier, wherein the third source identifier is different than the first source identifier and is also different than the second source identifier, and wherein the third source provides data for the IPTV channel and was selected as a recipient of the fourth join request message based upon a second service bit rate of the second subscriber.

6. The method of claim 1, further comprising:
creating, by the router, a first multicast entry that comprises a first incoming interface (IIF) value identifying the second source and a single first outgoing interface (OIF) value identifying a first circuit leading to the first client device; and
creating, by the router, a second multicast entry that comprises a second IIF value identifying a third source and a single second OIF value identifying a second circuit leading to a second client device.

7. The method of claim 6, further comprising:
receiving, at the router, a plurality of packets from the second source; and
transmitting, by the router, the plurality of packets over the first circuit leading to the first client device without dropping any of the plurality of packets.

8. The method of claim 1, wherein the first source identifier is a placeholder identifier that does not identify any actual source of the IPTV channel.

9. The method of claim 1, wherein the first source identifier is an actual identifier for a source of the IPTV channel.

10. The method of claim 9, further comprising:
receiving, at the router, a fifth join request message originated by a third client device of a third subscriber indicating a request to become a member of the multicast group to receive data for the IPTV channel, wherein the third join request message includes the first source identifier associated with the IPTV channel; and
transmitting, by the router, a sixth join request message to the first source identified by the first source identifier, wherein the first source provides data for the IPTV channel and was selected as a recipient of the sixth join request message based upon a third service bit rate of the third subscriber.

11. A non-transitory machine-readable storage medium having instructions which, when executed by one or more processors of a device, cause the device to implement a router to perform operations for multicast service translation, the operations comprising:
receiving a first join request message originated by a first client device of a first subscriber indicating a request to become a member of a multicast group to receive data for an Internet Protocol (IP) television (IPTV) channel, wherein the first join request message includes a first source identifier associated with the IPTV channel; and
responsive to said receiving the first join request message, transmitting, by the router, a second join request message to a second source identified by a second source identifier instead of the first source identifier, wherein the second source identifier is different than the first source identifier, and wherein the second source provides data for the IPTV channel and was selected as a recipient of the second join request message based upon a service bit rate of the first subscriber.

12. The non-transitory machine-readable storage medium of claim 11, wherein the operations further comprise:
after said receiving the first join request message:
determining a service level of the first subscriber, wherein the service level is associated with the service bit rate of the first subscriber; and
selecting, based upon the determined service level, the second source identifier from a plurality of channel source identifiers of a plurality of sources to be used as sources of data for the IPTV channel, wherein the second source provides the IPTV channel at a bit rate that is the same as the service bit rate of the first subscriber or at a closest bit rate to the service bit rate when compared to other bit rates of others of the plurality of sources.

13. The non-transitory machine-readable storage medium of claim 11, wherein the operations further comprise:
after said receiving the first join request message:
transmitting a message to a controller of a Software Defined Networking (SDN) network, wherein the message causes the controller to determine a service level assigned to the first subscriber and to identify, based upon the determined service level, the second source to be used to provide the IPTV channel to the first client device of the first subscriber; and
receiving, from the controller, configuration data for a first multicast entry that comprises the second source identifier that identifies the second source, wherein the first multicast entry is to be used by the router to forward data for the IPTV channel transmitted by the second source toward the first client device of the first subscriber.

14. The non-transitory machine-readable storage medium of claim 11, wherein the first join request message is an Internet Group Management Protocol (IGMP) version 3 (IGMPv3) message or a Multicast Listener Discovery (MLD) version 2 (MLDv2)message, and wherein the second join request message is a Protocol Independent Multicast (PIM) join message.

15. The non-transitory machine-readable storage medium of claim 14, wherein the operations further comprise:
receiving a third join request message originated by a second client device of a second subscriber indicating a request to become a member of the multicast group to receive data for the IPTV channel, wherein the third join request message includes the first source identifier associated with the IPTV channel; and
transmitting, by the router, a fourth join request message to a third source identified by a third source identifier instead of the first source identifier, wherein the third source identifier is different than the first source identifier and is also different than the second source identifier, and wherein the third source provides data for the IPTV channel and was selected as a recipient of the fourth join request message based upon a second service bit rate of the second subscriber.

16. The non-transitory machine-readable storage medium of claim 11, wherein the operations further comprise:
creating a first multicast entry that comprises a first incoming interface (IIF) value identifying the second source and a single first outgoing interface (OIF) value identifying a first circuit leading to the first client device; and creating a second multicast entry that comprises a second IIF value identifying a third source and a single second OIF value identifying a second circuit leading to a second client device.

17. The non-transitory machine-readable storage medium of claim 16, wherein the operations further comprise:
   receiving a plurality of packets from the second source; and
   transmitting the plurality of packets over the first circuit leading to the first client device without dropping any of the plurality of packets.

18. The non-transitory machine-readable storage medium of claim 11, wherein the first source identifier is a placeholder identifier that does not identify any actual source of the IPTV channel.

19. The non-transitory machine-readable storage medium of claim 11, wherein the first source identifier is an actual identifier for a source of the IPTV channel, and wherein the operations further comprise:
   receiving a fifth join request message originated by a third client device of a third subscriber indicating a request to become a member of the multicast group to receive data for the IPTV channel, wherein the third join request message includes the first source identifier associated with the IPTV channel; and
   transmitting, by the router, a sixth join request message to the first source identified by the first source identifier, wherein the first source provides data for the IPTV channel and was selected as a recipient of the sixth join request message based upon a third service bit rate of the third subscriber.

20. A device comprising:
   one or more processors; and
   one or more non-transitory machine-readable storage media having instructions which, when executed by the one or more processors, cause the device to implement a router to perform operations for multicast service translation, the operations comprising:
   receiving a first join request message originated by a first client device of a first subscriber indicating a request to become a member of a multicast group to receive data for an Internet Protocol (IP) television (IPTV) channel, wherein the first join request message includes a first source identifier associated with the IPTV channel; and
   responsive to said receiving the first join request message, transmitting, by the router, a second join request message to a second source identified by a second source identifier instead of the first source identifier, wherein the second source identifier is different than the first source identifier, and wherein the second source provides data for the IPTV channel and was selected as a recipient of the second join request message based upon a service bit rate of the first subscriber.

* * * * *